Figure 1:
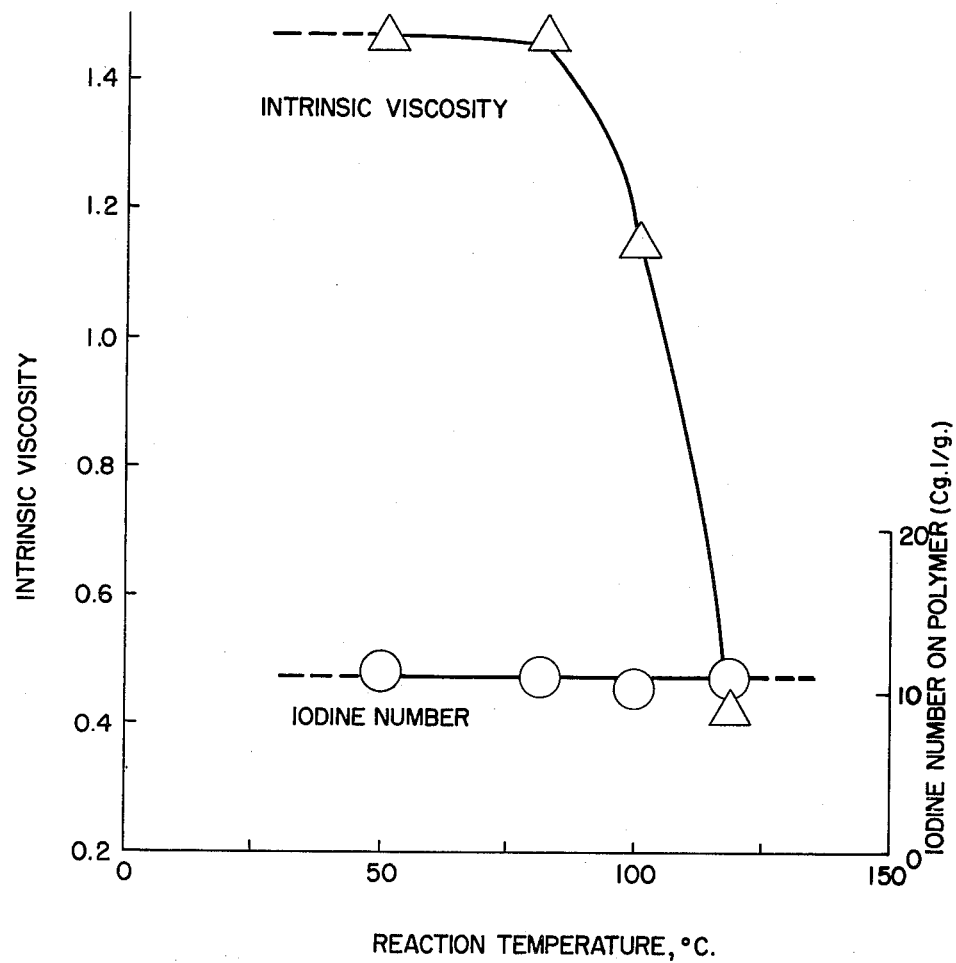

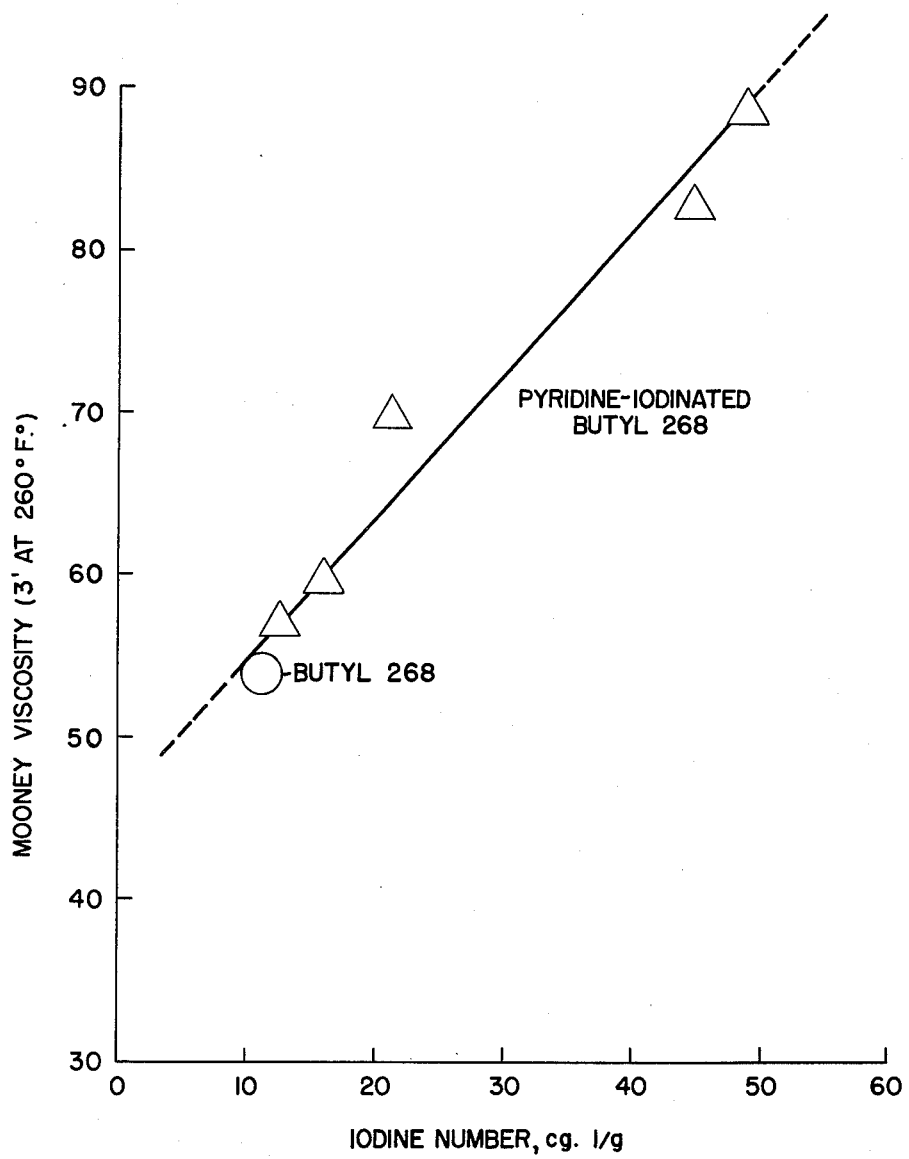

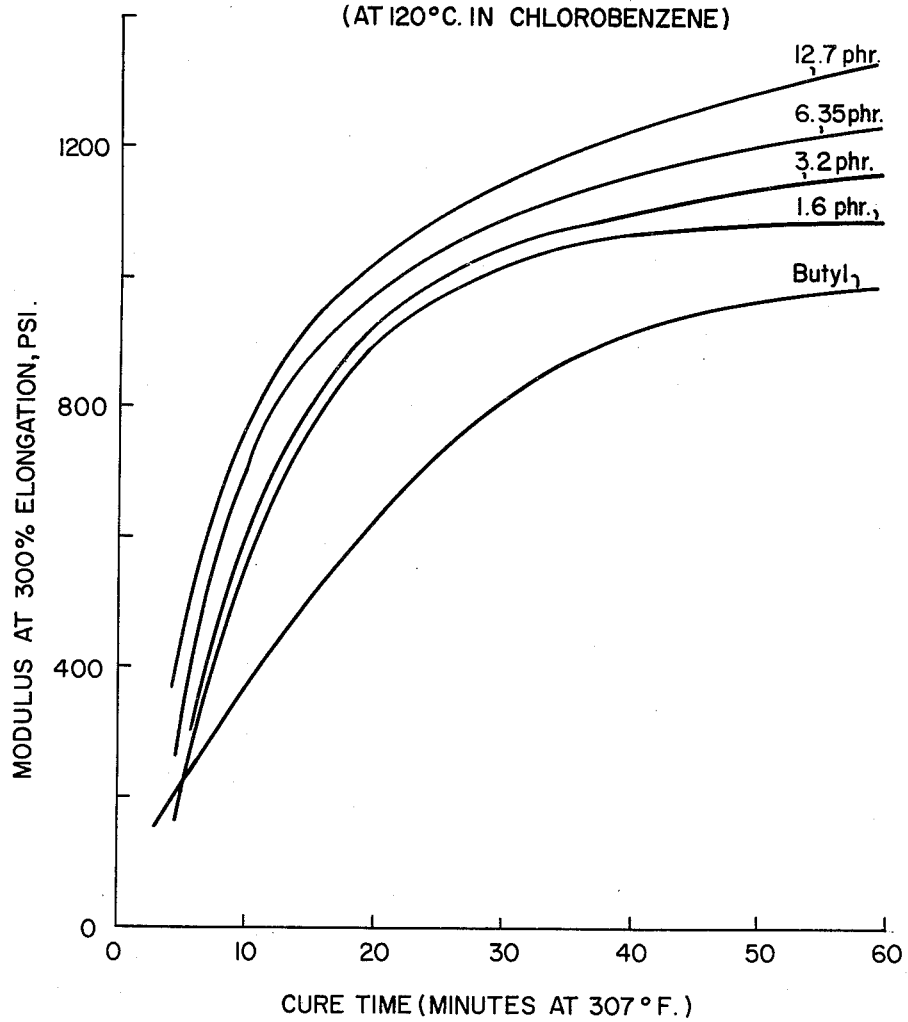

United States Patent Office 3,057,834
Patented Oct. 9, 1962

3,057,834
PYRIDINE IODINATED BUTYL RUBBER
Leon Sherwood Minckler, Jr., Metuchen, Delmer L. Cottle, Highland Park, and Clifford W. Muessig, Roselle, N.J., assignors to Esso Research and Engineering Company, a corporation of Delaware
Filed Dec. 23, 1959, Ser. No. 861,531
8 Claims. (Cl. 260—85.3)

This invention relates to a method of modifying butyl rubber. More particularly it relates to a method of increasing the iodine number of butyl rubber by treating it at carefully controlled conditions with elemental iodine and a pyrridine type amine.

This application is a continuation-in-part of Serial No. 781,449, filed December 19, 1958.

Butyl rubber, a term well known in the rubber art, e.g. chapter 24 in "Synthetic Rubber," edited by G. Whitby, is a rubbery copolymer comprising a major proportion of an isoolefin having 4 to 8 carbon atoms and a minor proportion of a multiolefin having 4 to 14, preferably 4 to 8 carbon atoms. The most commonly employed isoolefin is isobutylene, although other isoolefins such as 3-methylbutene-1 and 4-methylpentene-1 may be used. Suitable multiolefins, which are generally conjugated diolefins, include isoprene, butadiene-1,3, dimethylbutadiene-1,3, piperylene and the like. Most of the copolymers contain about 90 to 99.5 wt. percent isoolefin and 0.5 to 10 wt. percent diolefin, which in most instances is isoprene. The polymerization is generally carried out at a low temperature, e.g. between −50° to −165° C., in the presence of a Friedel-Crafts catalyst, such as aluminum trichloride, dissolved in a lower alkyl halide such as methyl chloride, ethyl ch'oride, etc. Their preparation is fully described in U.S. Patent 2,356,128. Butyl rubbers have a viscosity average molecular weight between about 200,000 and 1,500,000 or more and a Wijs iodine number between about 1 and 50.

It is desirable to increase the iodine number of butyl rubber so as to effect more rapid rates of cure as well as to obtain other improved properties. One of the suggested means has been to halogenate the polymer. Previous attempts to iodinate butyl rubber have not been successful, giving only gelation, degradation, or no reaction at all. On the other hand treatment with elemental chlorine and bromine results in the retention in the polymers of a considerable amount of these halogens which can be undesirable.

It has now been found that butyl rubber can be successfully modified and the iodine number increased by treating it at carefully controlled conditions with elemental iodine and a pyridine-type amine at elevated temperatures in the presence of a high boiling polar solvent.

The products obtained exhibit several interesting and unexpected properties. Surprisingly enough, no significant amount of iodine remains in the modified polymer. However, the iodine number is increased markedly and by a controlled amount depending on the reaction conditions. In addition, the Mooney viscosity of the polymer is increased sharply as a function of the iodine number with no corresponding change in intrinsic viscosity.

The vulcanizate properties of the pyridine-iodinated polymer are also improved. These improvements include significant increases in cure rate and dynamic properties.

The elemental iodine is utilized in an amount of from 1 to 25 wt. percent based on the polymer. Since it does not remain in the product it can be recovered.

The pyridine-type amine compounds which are within the purview of the present invention are those heterocyclic compounds included in the tertiary amine class which have the following general formulae:

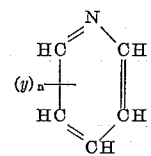

and

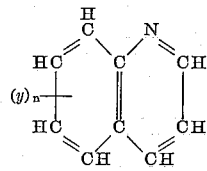

in which "$y$" is selected from the group consisting of R, OR, and OH; "R" being selected from the group consisting of $C_1$ to $C_{20}$ alkyl, cycloalkyl, aryl, aralkyl and alkaryl; "$n$" being an integer of between about 0 and 3. In other words, compounds having a pyridine or quinoline nucleus are employed. The pyridine-type compound is utilized in an amount of from 1 to 100 wt. percent based on the copolymer.

The temperature of the reaction has been found to be important. Thus a temperature in the range of about 85° to 150° C. has been found suitable since at temperatures below this the reaction is too slow to be practical.

The time of reaction also has to be controlled and is preferably in the range of about ¼ to 2 hours and the time may be shortened by heating to still higher temperatures, under pressure if necessary.

The solvent has also been found to be important. High boiling polar solvents or low boiling polar solvents under pressure can be used successfully while hydrocarbons such as n-heptane, isooctane, decalin are much less satisfactory. The polar solvents that can be employed include aryl halides, such as chlorobenzene, ethers, e.g. tetrahydrofuran and di-n-butyl ether. Especially effective and desirable are monochlorobenzene, nitromethane, nitrobenzene and carbon disulfide.

As a result of the reaction of this invention the iodine number is substantially increased. Iodine number of 100 can be obtained by selection of reaction temperature, time, solvent, etc. However, optimum utilization of this method occurs when the iodine number is about doubled.

The product obtained is substantially free of iodine, i.e. contains no more than 0.25% iodine (or 0.01 mole per 100 g. polymer) or about 2% of the theoretical amount which could go in by other halogenations.

The products can be recovered by precipitation with about an equal volume of acetone followed by acetone wash in a blender. It can then be re-dissolved in a hydrocarbon such as heptane, re-precipitated and re-washed with acetone again. Drying is conveniently accomplished at pressures below 200 mm. of mercury.

This invention and its advantages will be better understood by reference to the following examples of the treatment of an isoprene-isobutylene butyl rubber having a mole percent unsaturation of 1.5 to 2.0 and a Mooney 212° F. at 8 min. of 71+.

Details of the treatments and results are shown in Tables I and II. They are further discussed in the examples.

TABLE I
Pyridine-Iodination of Butyl

| | | | | |
|---|---|---|---|---|
| Diluent | PhCl | PhCl | PhCl | PhCl |
| Reagents, pyridine, ml | 10 | 10 | 10 | 10 |
| Reactants, iodine, gm | 1.6 | 3.2 | 6.4 | 12.7 |
| Conditions, °C./hours | 120/0.5 | 120/0.5 | 120/0.5 | 120/0.5 |
| Product, percent yield | 98 | 99 | 99 | 99 |
| Iodine number, cg. I/g | 12.4 | 12.5 | 16.0 | 21.5 |
| Intrinsic viscosity | 1.52 | 1.49 | 1.52 | 1.44 |
| Mooney viscosity, 3'/260°F | 57 | 58 | 60 | 74 |
| Percent chlorine | <0.1 | <0.1 | <0.1 | <0.1 |
| Percent iodine | <0.1 | <0.1 | <0.1 | <0.1 |
| Percent nitrogen | | | | |
| COMPOUND | | | | |
| Cured 5' at 307°F.: | | | | |
|   Modulus, p.s.i./300% | 185 | 170 | 290 | 515 |
|   Tensile, p.s.i | 1,500 | 1,170 | 2,045 | 2,460 |
|   Elongation, percent | 930 | 875 | 860 | 770 |
| Cured 15' at 307°F.: | | | | |
|   Modulus, p.s.i./300% | 790 | 805 | 885 | 845 |
|   Tensile, p.s.i | 2,390 | 2,475 | 2,710 | 2,525 |
|   Elongation, percent | 660 | 665 | 685 | 675 |
| Cured 25' at 307°F.: | | | | |
|   Modulus, p.s.i./300% | 970 | 990 | 1,045 | 1,085 |
|   Tensile, p.s.i | 2,370 | 1,960 | 2,470 | 2,430 |
|   Elongation, percent | 615 | 565 | 595 | 615 |
| Cured 45' at 307°F.: | | | | |
|   Modulus, p.s.i./300% | 1,075 | 1,115 | 1,190 | 1,275 |
|   Tensile, p.s.i | 1,820 | 1,925 | 1,940 | 1,845 |
|   Elongation, percent | 500 | 520 | 500 | 485 |
| Cured 90' at 307°F.: | | | | |
|   Modulus, p.s.i./300% | 1,080 | 1,215 | 1,290 | 1,315 |
|   Tensile, p.s.i | 1,635 | 1,680 | 1,815 | 1,565 |
|   Elongation, percent | 470 | 445 | 465 | 375 |
| Goodrich flexometer, 45'/307°F.: | | | | |
|   Dynamic drift, percent | 8.6 | 8.0 | 6.5 | 4.8 |
|   Final dynamic comp., percent | 12.1 | 10.8 | 9.8 | 6.8 |
|   Compression set, percent | 12.3 | 11.4 | 9.9 | 8.4 |
|   Maximum temp. rise, °C | 19 | 18 | 18 | 17 |
|   To max. temp., min | 18 | 14 | 14 | 14 |
|   Appearance | 0 | 0 | 0 | 0 |
|   Shore "A" | 50 | 50 | 50 | 53 |
| Mooney scorch (30'/260°F.): | | | | |
|   ML | 26 | 29 | 29 | 32 |
|   MS₅ | 19' | 19' | 16' | 14' |
|   MS₁₀ | 21' | 21' | 18' | 16' |
|   MF | 74 | 73 | 89 | 100 |

EXAMPLE 1

FIGURE I shows controlled iodine reaction in the absence of pyridine. This FIGURE demonstrates:

(1) The absence of pyridine results in no increase in iodine number.

(2) The polymer normally breaks down at the temperature utilized in this invention.

EXAMPLE 2

The butyl rubber sample was treated with pyridine and iodine for 150 minutes. The iodine number increased in a linear manner although polymer vulcanizate properties do not improve much after the iodine number has doubled. The iodine number also goes up with increasing iodine concentration.

EXAMPLE 3

FIGURE II shows how the Mooney viscosity increases with iodine number. This makes for a product adapted for oil extension and high loading.

EXAMPLE 4

The modified butyl rubber was compounded on a cold mill using the formulation shown below. This particular formulation with a non-reinforcing black and high sulfur content was used to bring out differences in cure rate and vulcanizate properties resulting from variations in the unsaturation of these polymers.

| | Parts |
|---|---|
| Polymer | 100 |
| Pelletex (SRF) (furnace black pellets) | 50 |
| Phenyl-beta-naphthylamine | 0.2 |
| Zinc stearate | 1.0 |
| Zinc oxide | 5.0 |
| Sulfur | 2.0 |
| Tuads | 1.0 |

TABLE II
Pyridine-Iodination of Butyl

| | | | | | | | | | | | | | | Butyl 268 |
|---|---|---|---|---|---|---|---|---|---|---|---|---|---|---|
| Diluent | PhCl | PhCl | PhCl | PhCl | n-C₇ | n-C₇ | (¹) | (²) | PhCl | PhCl | PhCl | PhCl | PhCl | |
| Reagents, pyridine, ml | 10 | 10 | 10 | 16 | 10 | 10 | 10 | 10 | 0 | 0 | 0 | 0 | 10 | |
| Reactants, iodine, gm | 12.7 | 12.7 | 12.7 | 20 | 6.3 | 12.7 | 12.7 | 12.7 | 12.7 | 12.7 | 12.7 | 12.7 | 0 | |
| Conditions, °C./hours | 80/1.0 | 30/66 | 120/2.5 | 120/0.5 | 80/0.5 | 80/0.5 | 100/1.0 | 120/0.5 | 50/1.0 | 80/1.0 | 100/1.0 | 120/0.5 | 120/0.5 | |
| Product, percent yield | 98 | 98 | | 99 | 99 | 99 | 93 | 96 | 92 | 97 | 94 | 75 | 99 | |
| Iodine number, cg. I/g | 15.4 | 13.5 | 48.4 | 44.9 | 11.6 | 11.6 | 17.4 | 21.8 | 11.5 | 11.1 | 10.4 | 11.1 | 11.7 | 11.8 |
| Intrinsic viscosity | 1.54 | 1.52 | 1.39 | 1.38 | 1.53 | 1.55 | 1.52 | 1.44 | 1.48 | 1.48 | 1.16 | 0.43 | 1.53 | 1.49 |
| Mooney viscosity, 3'/260°F | 56 | 61 | 89 | 83 | 56 | 58 | 55 | 52 | 53 | 55 | 41 | (³) | 55 | 53 |
| Percent chlorine | | <0.1 | 0.1 | 0.26 | | | | | | | | | 0.14 | |
| Percent iodine | 0.11 | <0.2 | 0.43 | <9.1 | <0.1 | <0.1 | <0.1 | <0.1 | <0.1 | | | 0.31 | | |
| Percent nitrogen | <0.01 | <0.01 | 0.02 | | | 0.02 | <0.01 | <0.01 | 0.15 | | | | | |
| COMPOUND | | | | | | | | | | | | | | |
| Cured 5' at 307° F.: | | | | | | | | | | | | | | |
|   Modulus, p.s.i./300% | 240 | 260 | 490 | 515 | 130 | 150 | 300 | 340 | 105 | 195 | 110 | | 130 | 210 |
|   Tensile, p.s.i | 1,870 | 2,080 | 1,950 | 2,515 | 1,320 | 1,385 | 1,995 | 2,260 | 985 | 1,590 | 655 | | 1,165 | 1,940 |
|   Elongation, percent | 875 | 830 | 660 | 740 | 1,100 | 1,035 | 825 | 845 | 1,215 | 955 | 1,105 | | 1,105 | 875 |
| Cured 15' at 307° F.: | | | | | | | | | | | | | | |
|   Modulus, p.s.i./300% | 625 | 600 | 820 | 850 | 640 | 655 | 610 | 635 | 665 | 715 | 610 | | 665 | 580 |
|   Tensile, p.s.i | 2,525 | 2,490 | 2,115 | 2,705 | 2,215 | 2,375 | 2,510 | 2,440 | 2,535 | 2,495 | 2,055 | | 2,630 | 2,575 |
|   Elongation, percent | 700 | 715 | 585 | 665 | 660 | 675 | 735 | 725 | 755 | 735 | 735 | | 715 | 725 |
| Cured 25' at 307° F.: | | | | | | | | | | | | | | |
|   Modulus, p.s.i./300% | 765 | 840 | 1,000 | 1,170 | 875 | 895 | 815 | 795 | 925 | 845 | 810 | | 800 | 685 |
|   Tensile, p.s.i | 2,450 | 2,470 | 1,135 | 2,570 | 2,425 | 2,425 | 2,385 | 2,365 | 2,255 | 2,530 | 2,160 | | 2,350 | 2,025 |
|   Elongation, percent | 675 | 645 | 355 | 590 | 630 | 630 | 660 | 665 | 640 | 685 | 685 | | 620 | 600 |
| Cured 45' at 307° F.: | | | | | | | | | | | | | | |
|   Modulus, p.s.i./300% | 910 | 945 | 1,060 | 1,275 | 1,020 | 975 | 1,000 | 1,020 | 1,010 | 1,140 | 1,035 | | 1,000 | 940 |
|   Tensile, p.s.i | 2,230 | 2,275 | 1,175 | 2,200 | 1,960 | 1,550 | 2,135 | 2,220 | 2,240 | 2,170 | 2,030 | | 2,290 | 2,115 |
|   Elongation, percent | 615 | 605 | 350 | 520 | 540 | 485 | 580 | 575 | 610 | 595 | 600 | | 575 | 545 |
| Cured 90' at 307° F.: | | | | | | | | | | | | | | |
|   Modulus, p.s.i./300% | 1,150 | 1,140 | 1,120 | 1,280 | 1,125 | 1,115 | 1,105 | 1,165 | | | | | 1,115 | 1,015 |
|   Tensile, p.s.i | 2,050 | 1,770 | 1,120 | 1,660 | 1,580 | 1,575 | 1,965 | 1,955 | | | | | 1,710 | 1,795 |
|   Elongation, percent | 540 | 550 | 300 | 385 | 445 | 450 | 505 | 495 | | | | | 480 | 500 |
| Goodrich Flexometer, 45'/307° F.: | | | | | | | | | | | | | | |
|   Dynamic drift, percent | 5.0 | 5.4 | 6.5 | 4.4 | 10.2 | 8.7 | 7.4 | 5.9 | | | | | 7.6 | 8.6 |
|   Final dynamic comp., percent | 10.0 | 10.2 | 10.4 | 8.0 | 13.8 | 11.6 | 12.8 | 11.0 | | | | | 12.3 | 11.8 |
|   Compression set, percent | 9.0 | 8.5 | 10.1 | 7.9 | 13.9 | 11.8 | 10.4 | 9.1 | | | | | 11.1 | 11.8 |
|   Maximum temperature rise, °C | 20 | 20 | 20 | 20 | 20 | 19 | 21 | 20 | | | | | 20 | 21 |
|   To max. temperature, min | 18 | 20 | 10 | 12 | 20 | 24 | 18 | 14 | | | | | 20 | 20 |
|   Appearance | 0 | 0 | 0 | 0 | 0 | 0 | 6 | 2 | | | | | 2 | 0 |
|   Shore "A" | 52 | 51 | 55 | 53 | 52 | 51 | 50 | 52 | | | | | 51 | 50 |
| Mooney scorch (30'/260° F.): | | | | | | | | | | | | | | |
|   ML | | | | 36 | 25 | 26 | | | | | | | 24 | 23 |
|   MS₅ | | | | 11' | 19' | 19' | | | | | | | 17' | 15' |
|   MS₁₀ | | | | 12' | 21' | 21' | | | | | | | 19' | 17' |
|   MF | | | | 100/18' | 71 | 73 | | | | | | | 78 | 92 |

¹ Isooctane.  ² Decalin.  ³ Very low.

The compounds were press-cured at 307° F. for 5, 15, 25, 45 and 90 minutes. No problems were encountered in these operations and the appearances of the resulting vulcanizates were excellent.

FIGURE III shows the effect of iodine concentration in the reaction on cure rate of the resultant polymer. In a similar manner, other variables that gave an increase in iodine numbers gave improved cure rates, e.g. time, temperature, etc.

This invention is applicable also to alpha olefin homo- and copolymers such as are produced by Ziegler catalysts, e.g. polyethylene, polypropylene, etc.

The advantages of this invention will be apparent to those skilled in the art. Modified products of improved curing rates are obtained along with high Mooneys, no breakdown as in other halogenations, more oil extendable than other halogenated butyls and better physical and dynamic properties.

It is to be understood that this invention is not limited to the specific examples which have been offered merely as illustrations and that modifications may be made without departing from the spirit of the invention.

What is claimed is:

1. A process for modifying a rubbery copolymer of 90 to 99.5 wt. percent of an isoolefin having 4 to 8 carbon atoms and 0.5–10 wt. percent of a conjugated diolefin having 4 to 14 carbon atoms and having a Wijs iodine number between about 1 and 50 which comprises treating the copolymer with elemental iodine and a pyridine-type amine having a formula selected from the group consisting of:

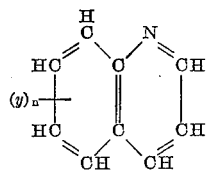

and

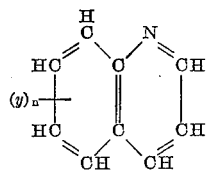

in which "y" is selected from the group consisting of R, OR, and OH; "R" being selected from the group consisting of $C_1$ to $C_{20}$ alkyl, cycloalkyl, aryl, aralkyl and alkaryl, "n" being an integer between 0 and 3, at a temperature in the range of about 85° to 150° C. in the presence of a polar organic solvent whereby the iodine number of the copolymer is substantially increased and separating the modified product which is substantially free of iodine.

2. The process of claim 1 in which the isoolefin is isobutylene and the multiolefin is isoprene.

3. The process of claim 2 in which the amine is utilized in an amount of about 1 to 100 wt. percent based on the copolymer.

4. The process of claim 3 in which the iodine is utilized in an amount of from 1 to 25 wt. percent based on the copolymer.

5. The process of claim 4 in which the time utilized is about ¼ to 2 hours.

6. The process of claim 5 in which the modified copolymer has an iodine number about double its initial value.

7. The process of claim 5 in which the polar solvent is chlorobenzene.

8. The process of claim 2 in which the pyridine-type amine is pyridine.

References Cited in the file of this patent

UNITED STATES PATENTS

| | | |
|---|---|---|
| 2,361,072 | Vining | Oct. 24, 1944 |
| 2,596,878 | Veersen | May 13, 1952 |
| 2,631,984 | Crawford | Mar. 17, 1953 |
| 2,739,141 | Ernst | Mar. 20, 1956 |
| 2,809,372 | Frederick | Oct. 8, 1957 |